(12) United States Patent
Dennis

(10) Patent No.: US 9,163,803 B2
(45) Date of Patent: Oct. 20, 2015

(54) HYBRID DRIVING LIGHT

(71) Applicant: Lightforce Australia Pty Ltd., Hindmarsh (AU)

(72) Inventor: Raymond L. Dennis, Hindmarsh (AU)

(73) Assignee: Lightforce Australia Pty Ltd., Hindmarsh (AU)

( * ) Notice: Subject to any disclaimer, the term of this patent is extended or adjusted under 35 U.S.C. 154(b) by 0 days.

(21) Appl. No.: 14/011,130

(22) Filed: Aug. 27, 2013

(65) Prior Publication Data

US 2015/0062894 A1    Mar. 5, 2015

(51) Int. Cl.
*B60Q 1/00* (2006.01)
*F21V 7/06* (2006.01)
*F21V 13/04* (2006.01)
*F21S 8/10* (2006.01)
*F21Y 113/02* (2006.01)

(52) U.S. Cl.
CPC ............... *F21V 7/06* (2013.01); *B60Q 1/0058* (2013.01); *F21S 48/1195* (2013.01); *F21V 13/04* (2013.01); *F21Y 2113/02* (2013.01)

(58) Field of Classification Search
CPC ............... B60Q 1/0058; F21S 48/1195; F21Y 2113/00; F21Y 2113/02
USPC ............... 362/228, 249.02, 249.06, 506, 507, 362/543–545
See application file for complete search history.

(56) References Cited

U.S. PATENT DOCUMENTS

2007/0091632 A1*   4/2007   Glovatsky et al. ............ 362/547

* cited by examiner

*Primary Examiner* — Anh Mai
*Assistant Examiner* — Steven Horikoshi
(74) *Attorney, Agent, or Firm* — Wood, Herron & Evans, LLP

(57) ABSTRACT

Disclosed is a hybrid lamp assembly (10) which includes a substantially parabolic reflector (12) having an open end (20) and a circumferential mounting member (18) extending outwardly from the open end (20) of the reflector (12). The mounting member (18) presents a plurality of nonparallel mounting surfaces (22). A primary, non-LED light source (14) is operably assembled with the parabolic reflector (12). A secondary light source (24), comprising a plurality of LED lamps (26), is positioned circumferentially around the open end (20) on the mounting surfaces (22). The LED lamps (26) are each mounted to project in a direction (42) substantially normal to the surface on which it is mounted.

5 Claims, 4 Drawing Sheets

HYBRID DRIVING LIGHT

FIELD OF THE INVENTION

This invention relates to a light assembly that combines a primary light source, such as an incandescent or high intensity discharge (HID) lamp having a reflector, with a circumferential array of light emitting diode (LED) lamps that are mounted to produce an evenly distributed blanket of light over a defined area calculated by optical requirements.

BACKGROUND OF THE INVENTION

Vehicle lighting devices have been produced that combine light sources of different types. In some examples, the purpose of the combination is purely ornamental or decorative. In other examples, the combination serves to provide light in two different spectra, such as visible and infrared or in two different visible spectrum colors. In yet other examples, light sources of different types are combined to provide energy efficiency.

Generally, auxiliary vehicle lights are designed to producing either a narrow (pencil) long-range beam or a spread-beam (driving) pattern. Some lights can be configured for either pattern, but not both at the same time. Still others are designed for use in foggy situations, providing a wide, bar-shaped beam of light with a sharp cutoff at the top to reduce the glareback from fog or falling snow, and are generally aimed and mounted low.

SUMMARY OF THE INVENTION

Disclosed is a hybrid lamp assembly which includes a substantially parabolic reflector having an open end and a circumferential mounting member extending outwardly from the open end of the reflector. The mounting member presents a plurality of nonparallel mounting surfaces. A primary, non-LED light source is operably assembled with the parabolic reflector. A secondary light source, comprising a plurality of LED lamps, is positioned circumferentially around the open end on the mounting surfaces. The LED lamps are each mounted to project in a direction substantially normal to the surface on which it is mounted.

According to other aspects of the invention, the LED lamps may be situated in pairs on each of the mounting surfaces. The assembly may also include a housing in which the reflector, mounting member and light sources are mounted and a lens. The primary light source may be configured to project a long-range beam of light and the LEDs of the secondary light source configured to project a shorter range blanket of light.

The mounting member may include upper and lower mounting surfaces substantially normal to the beam of the primary light source and lateral mounting surfaces angled inwardly to cross the beam of the primary light source.

BRIEF DESCRIPTION OF THE DRAWINGS

Like reference numerals are used to indicate like parts throughout the various figures of the drawing, wherein.

DETAILED DESCRIPTION OF THE INVENTION

Figure 1:
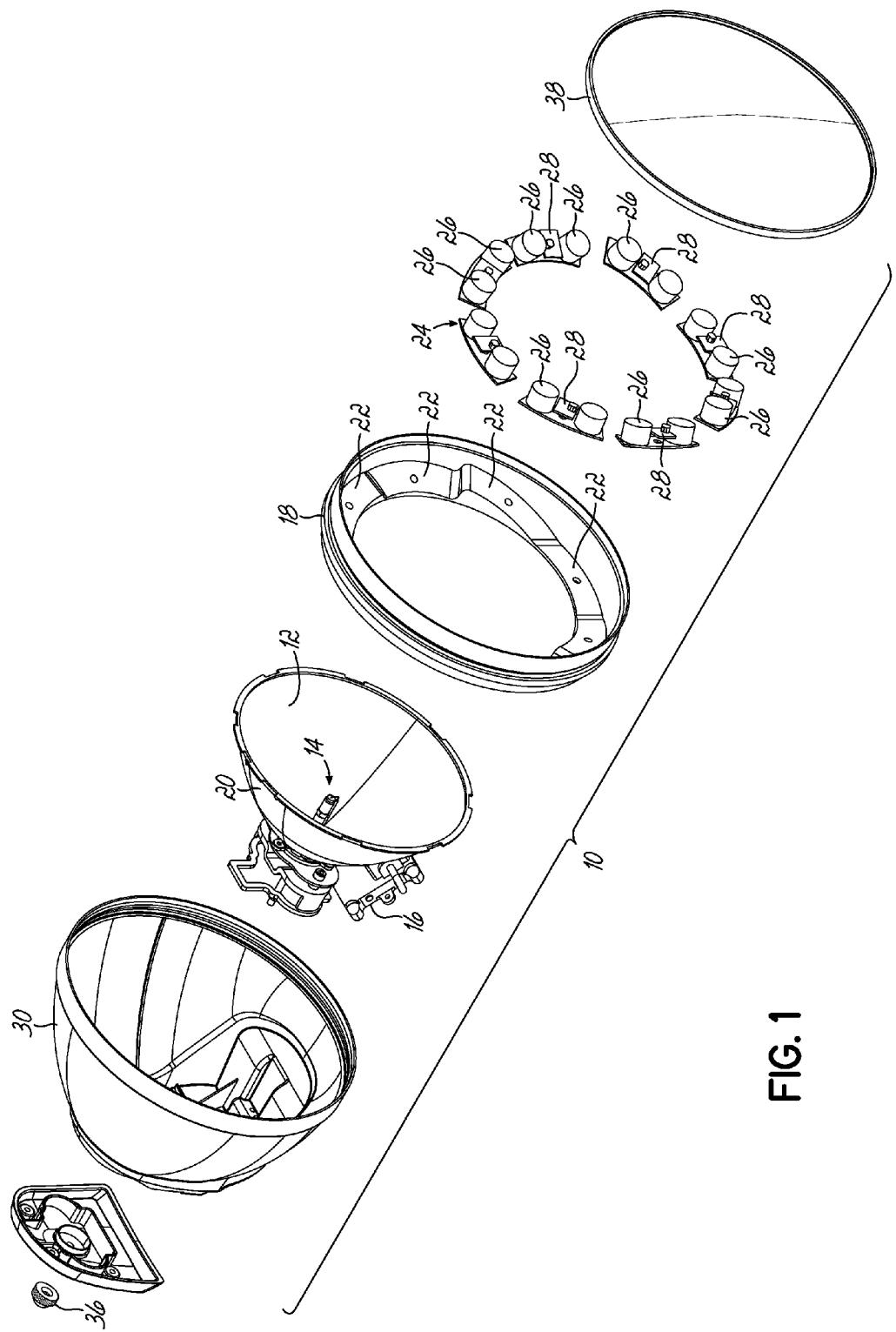
FIG. 1 is an exploded pictorial view of a hybrid light assembly according to one embodiment of the present invention.

Referring to the various figures of the drawings, and first to FIG. 1, therein is shown at 10 a hybrid light assembly according to one embodiment of the present invention. The assembly 10 includes a reflector 12, which is generally parabolic. A primary light source 14 is situated at or near the base of the reflector 12 in order to project a relatively tightly focused, long-range beam of light. The primary light source 14 can be an incandescent, halogen, or high intensity discharge (HID) lamp or bulb. If necessary, an appropriate ballast 16 may be used in conjunction with the bulb of the primary light source 14.

A circumferential mounting member 18 is provided to extend outwardly from the open end 20 of the reflector 12. The mounting member 18 presents a plurality of circumferentially-spaced mounting surfaces 22 situated radially outwardly from the open end 20 of the reflector 12 when assembled.

A secondary light source 24 is comprised of a plurality of light-emitting diodes (LEDs) 26 which are positioned on the mounting surfaces 22 of the mounting member 18 circumferentially around the open end 20 of the reflector 12. In the illustrated embodiment, the LEDs 26 are situated in pairs on each of the mounting surfaces 22. Each of the LEDs may be positioned within or integrally formed with a lens that directs light substantially normal (i.e., perpendicular) to the surface on which it is mounted. Each LED 26, or groups (such as pairs) thereof, may be mounted on a printed circuit board (PCB) and/or heat sink 28 for ease of assembly and operation according to well-known requirements.

For assembly, the LEDs 26 of the secondary light source 24 and reflector 12 are assembled to the mounting member 18, which is then assembled along with the primary light source 14 and ballast 16 (if required) into a housing 30. Access to service or replace the primary light source 14 may be gained through a rear opening 32 in the housing 30. The opening 32 may be closed with a removable cover 34 attached with a threaded fastener 36. A lens 38 is secured around its periphery to either the mounting member 18 (as shown) or housing 30.

Figure 2:
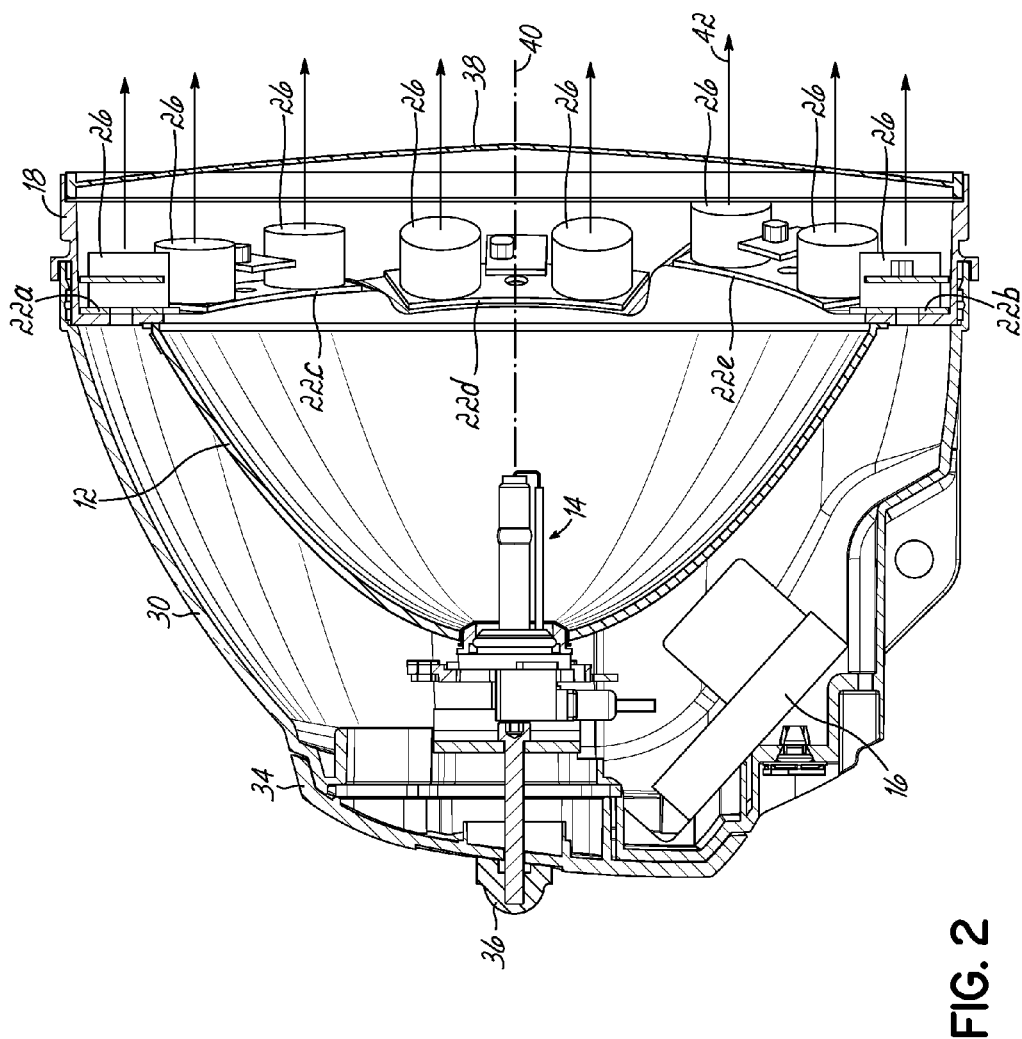
FIG. 2 is a side sectional view of the hybrid light assembly.
Figure 3:
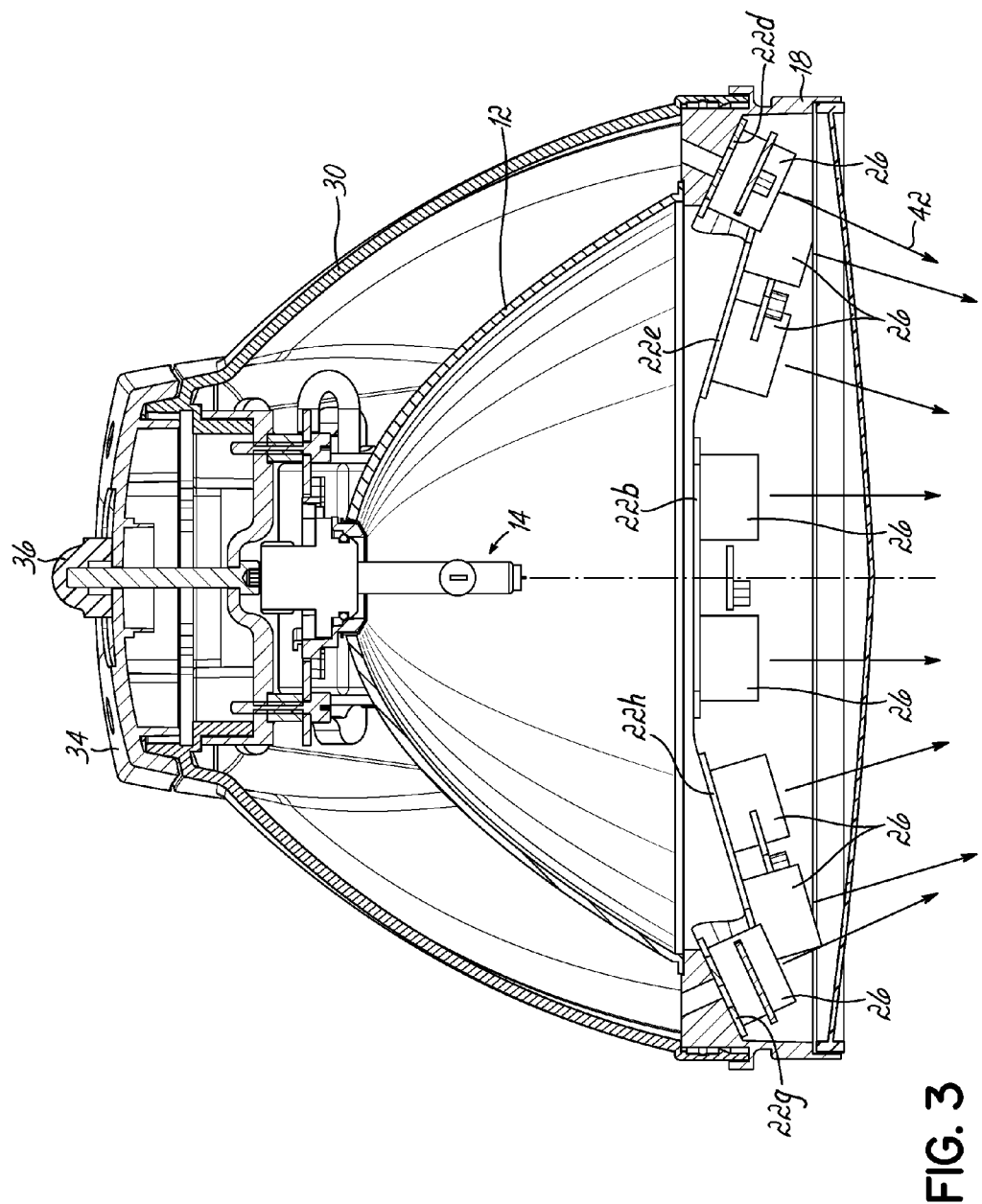
FIG. 3 is a top sectional view thereof.
Figure 4:
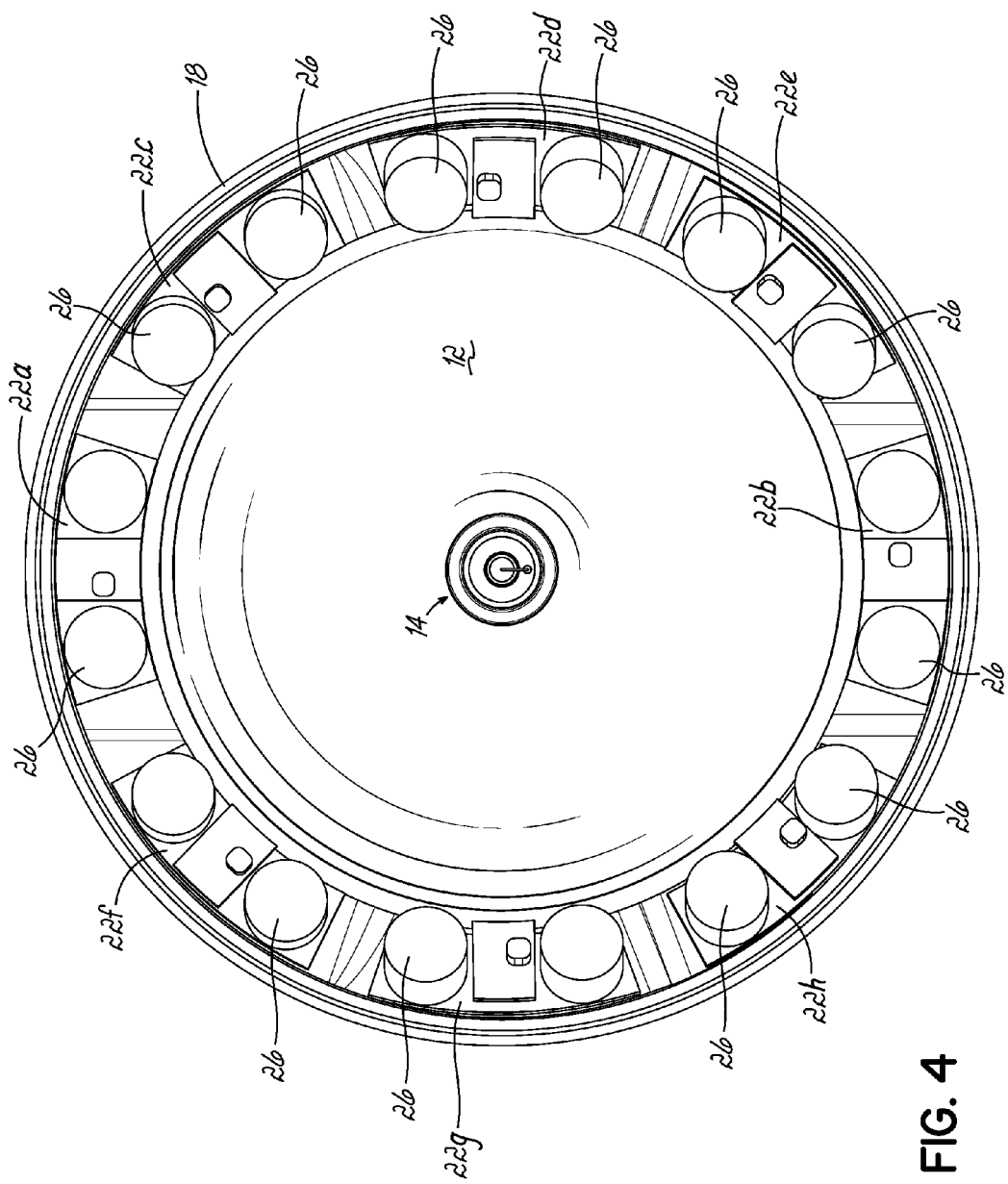
FIG. 4 is a front plan view thereof.

Referring now also to FIGS. 2-4, therein it can be seen that the substantially parabolic reflector 12 has an axis, indicated at 40, corresponding with the direction along which the primary light source 14 projects a long-range beam of light. The circumferential mounting member 18 presents a plurality of nonparallel mounting surfaces 22. Eight such mounting surfaces 22 are provided in the illustrated embodiment. The uppermost (22*a*) and lowermost (22*b*) mounting surfaces are substantially perpendicular to the axis 40 and the LEDs 26 of the secondary light source 24 mounted on these surfaces 22*a*, 22*b* project light in a direction substantially parallel to the axis 40. Each of the other six mounting surfaces 22*c*, 22*d*, 22*e*, 22*f*, 22*g*, 22*h* present mounting surfaces which are non-parallel to each other and to the upper and lower mounting surfaces 22*a*, 22*b*. In the illustrated embodiment, pairs of LEDs 26, mounted on a PCB/heat sink, are situated and attached to the mounting surfaces 22A-H to project light in a direction substantially normal to each of their respective mounting surfaces.

In preferred form, each of the LEDs 26 includes a lens (either integral or attached) to project a substantial portion of the light produced in a direction normal to the base on which it is situated. As shown in FIGS. 2 and 3, the positioning of the LEDs 26 on the mounting surfaces 22 directs the light of each LED 26 primarily as shown by vector arrows 42. As illustrated in FIG. 2, the vertical component of this direction vector is substantially parallel to the axis 40 of the beam of light produced by the primary light source 14 and parabolic reflector 12. As illustrated in FIG. 3, the horizontal components of these direction vectors 42 is such that laterally positioned LEDs 26 project light which crosses the axis 40. In this manner, a more uniform "blanket" of light is produced at short range and over an area approximating a horizontal rectangle. Light from the secondary light source 24 is not significantly directed upwardly or downwardly where, at short distances, the light would not benefit the vehicle operator.

While there have been shown and described what are at present considered to be the preferred embodiments of the invention, it will apparent to those skilled in the art that various changes and modifications can be made herein without departing from the scope of the invention as defined by the appended claims.

What is claimed is:

1. A hybrid lamp assembly, comprising:
   a substantially parabolic reflector having an open end;
   a circumferential mounting member extending outwardly from the open end of the reflector, the mounting member presenting a plurality of nonparallel mounting surfaces;
   a primary, non-LED light source operably assembled with the parabolic reflector; and
   a secondary light source comprising a plurality of LED lamps positioned circumferentially around the open end on the mounting surfaces, the LED lamps each being mounted to project in a direction substantially normal to the surface on which it is mounted,
   wherein the mounting member includes upper and lower mounting surfaces substantially normal to the beam of the primary light source and lateral mounting surfaces angled inwardly to cross the beam of the primary light source.

2. A hybrid lamp assembly according to claim 1, wherein the LED lamps are situated in pairs on each of the mounting surfaces.

3. A hybrid lamp assembly according to claim 1, further comprising a housing in which the reflector, mounting member and light sources are mounted.

4. A hybrid lamp assembly according to claim 2, further comprising a lens.

5. A hybrid lamp assembly according to claim 1, wherein the primary light source is configured to project a long-range beam of light and the LEDs of the secondary light source are configured to project a shorter range blanket of light.

* * * * *